United States Patent [19]
Guerinot et al.

[11] Patent Number: 6,147,720
[45] Date of Patent: Nov. 14, 2000

[54] TWO LAMP, SINGLE LIGHT VALVE PROJECTION SYSTEM

[75] Inventors: William F. Guerinot, deceased, late of Yorktown Heights, N.Y.; by Marlene Guerinot, legal representative, Knoxville, Tenn.; Matthew Scott Brennesholtz, Pleasantville; Douglas A. Stanton, Ossining, both of N.Y.

[73] Assignee: Philips Electronics North America Corporation, NY, N.Y.

[21] Appl. No.: 08/579,655

[22] Filed: Dec. 27, 1995

[51] Int. Cl.[7] .............................. H04N 5/64; H04N 9/12
[52] U.S. Cl. ............................................ 348/744; 348/743
[58] Field of Search .................................. 348/742, 743, 348/744, 750, 751, 752, 754–756, 68, 69, 70; 349/5, 7; 353/85, 51, 108; H04N 5/74, 9/31

[56] References Cited

U.S. PATENT DOCUMENTS

| | | | |
|---|---|---|---|
| 3,510,571 | 5/1970 | Biedermann | 348/750 |
| 3,894,798 | 7/1975 | Wolf | 353/122 |
| 4,404,585 | 9/1983 | Hjortzberg | 348/271 |
| 5,071,230 | 12/1991 | Natano et al. | 359/53 |
| 5,386,250 | 1/1995 | Guerinot | 348/770 |
| 5,428,408 | 6/1995 | Stanton | 348/742 |
| 5,475,513 | 12/1995 | Nakanishi et al. | 359/40 |
| 5,580,142 | 12/1996 | Kurematsu et al. | 353/31 |
| 5,612,753 | 3/1997 | Poradish et al. | 348/743 |
| 5,619,284 | 4/1997 | Magocs | 348/757 |
| 5,654,775 | 8/1997 | Brennesholtz | 348/742 |

Primary Examiner—John K. Peng
Assistant Examiner—Linus Lo
Attorney, Agent, or Firm—Bernard Franzblau; Jack D. Slobod

[57] ABSTRACT

A projection system includes first and second light sources which are disposed at an angle with respect to each other and are activated during respective different phases of an illumination cycle to illuminate a spot on different sides of a segmented rotary filter wheel. The filter wheel is alternately used to transmit light from one of the light sources, and to reflect light from the other light source, to a light valve, the output of which is projected onto a screen. The wheel segments may be alternately clear and mirrored or may alternately transmit and reflect colors to produce color sequential illumination of the light valve. In addition to filter wheels producing sequences of red, blue, green illumination, including the possibility of splitting a color phase into non-adjacent smaller phases to reduce color artifacts, a simple filter wheel which in two rotations produces a sequence of red, blue, green, cyan, magenta, yellow color illumination, resulting in an expanded color gamut, is also disclosed. Blanking intervals during which both lamps are turned off span each passage of a segment boundary through the spot.

20 Claims, 6 Drawing Sheets

TWO LAMP, SINGLE LIGHT VALVE PROJECTION SYSTEM

BACKGROUND OF THE INVENTION

1. Field of the Invention

The present invention relates to projection systems employing a single light valve.

2. Description of the Related Art

Light valves operating in a transmission or reflection mode, using liquid crystal, moving mirror, oil film, or other technologies are known for modulating a cross section of a light beam in two dimensions in response to an image control signal. A key use of such light valves is in systems employing rear or front projection of light to display video images, in particular color video images. Prior art single lamp, single light valve systems provide full color through a variety of methods, such as employing red, green and blue sub-pixels in the light valve with microfilters, color sequential addressing or falling raster addressing. The choice of lamps suitable for light valve projection is very limited, especially if long life is desired. One suitable lamp from the point of view of long life and high lumens per watt is the 100 W UHP lamp available from Philips Lighting, or similar lamps available from other manufacturers. The main problem with using these long life, short arc lamps is that, they often cannot be scaled up to higher power levels. In general, higher power lamps such as xenon or metal halide have other undesirable properties such as short life or large arc size. Therefore, if a brighter system is desired, multiple lamps must be used.

A two lamp, one light valve system is disclosed in commonly-owned U.S. Pat. No. 5,386,250. This patent describes a two lamp projection system where a deformable micro-mirrored device (DMD) is used as a combiner of the lamp outputs. This system suffers from two main problems: high cost and low efficiency of the DMD, such that even with improvements in efficiency expected in the near future, there would be far less than a doubling of brightness of the light illuminating the light valve relative to illumination from a single lamp.

SUMMARY OF THE INVENTION

It is an object of the present invention to allow the light from two lamps to be efficiently multiplexed onto a single light valve, thereby substantially doubling the system brightness.

The foregoing and other objects are fulfilled by providing a projection system comprising a segmented rotatable wheel, first and second light sources disposed at an angle with respect to each other and with respect to the wheel such as that each illuminates a focussed spot on a different side of the wheel at the same location. The light sources are activatable during respective different phases of a light source illumination cycle. A light valve is positioned to receive light from the spot illuminated by the first light source after transmission through the wheel and light from the spot illuminated by the second light source after reflection from the wheel, for modulating an output light beam formed from the received light.

In accordance with a first embodiment of the wheel, it has an even number of segments, one half the number of segments being used in transmission alternating with the other half of the segments being used in reflection. A wheel useable in systems which are not color sequential preferably has two segments, one transparent and one reflective.

In accordance with a second embodiment of a filter wheel for the system of the present invention for use in a color sequential system, the wheel has six color filtering segments, three segments which are used in transmission for transmitting different ones of a set of three colors from the first light source toward the light valve and three segments which are used in reflection for reflecting different ones of the three colors from the second light source toward said light valve. The segments are arranged and the wheel is synchronized in rotation with the activation of the first and second light sources such that the path portion from the first light source to said one side of the wheel and the path portion from said other side of the wheel to the light valve are coupled by a segment used in transmission when the first lamp is activated and said path portion from the second light source to said other side of the wheel and said path portion from said other side of the wheel to the light valve are coupled by a segment used in reflection when the second lamp is activated. Preferably, the three segments used in transmission are consecutive as are the three segments used in reflection. This allows the period of illumination cycle of the light sources to be twice the period of the video field (i.e. the light sources are active during alternate video fields) and the wheel to be rotated at one half rotation per video field.

A third embodiment of a color filtering wheel has first and second light filtering segments which are used in one of transmission or reflection and a third segment which is used in the other of transmission or reflection. In such an embodiment, the light sources may be different, the one supplying the first and second colors being relatively richer in these two colors and the one supplying the third color being relatively richer in that color.

A fourth embodiment of a color filtering wheel useable in the present invention has four segments, two non-adjacent segments of which transmit or reflect the same color. These two segments are each half the angular width of the other segments.

In a fifth embodiment of a color filtering wheel, it has at least three light filtering segments for producing a set of first, second and third colors, including a first segment for transmitting the first color of said set from the first light source toward the light valve, a second segment for reflecting a second color of the set from the second light source toward the light valve and a third segment for reflecting the third color of the set from the second light source to the light valve. A similar embodiment is also possible where the segments of the three segment wheel are chosen such that one is in transmission and two in reflection.

Lastly, in a sixth embodiment, a wheel having three light filtering segments is used and the first and second light sources are alternately activatable during alternate revolutions of the wheel such that the illumination cycle comprises two revolutions of the wheel. Each segment is used in reflection and in transmission in alternate revolutions of the wheel. This last embodiment allows for an apparent expanded color gamut.

Other objects, features and advantages of the present invention will become apparent upon perusal of the following detailed description when taken in conjunction with the appended drawing, wherein:

DETAILED DESCRIPTION OF THE PREFERRED EMBODIMENTS

Figure 1:
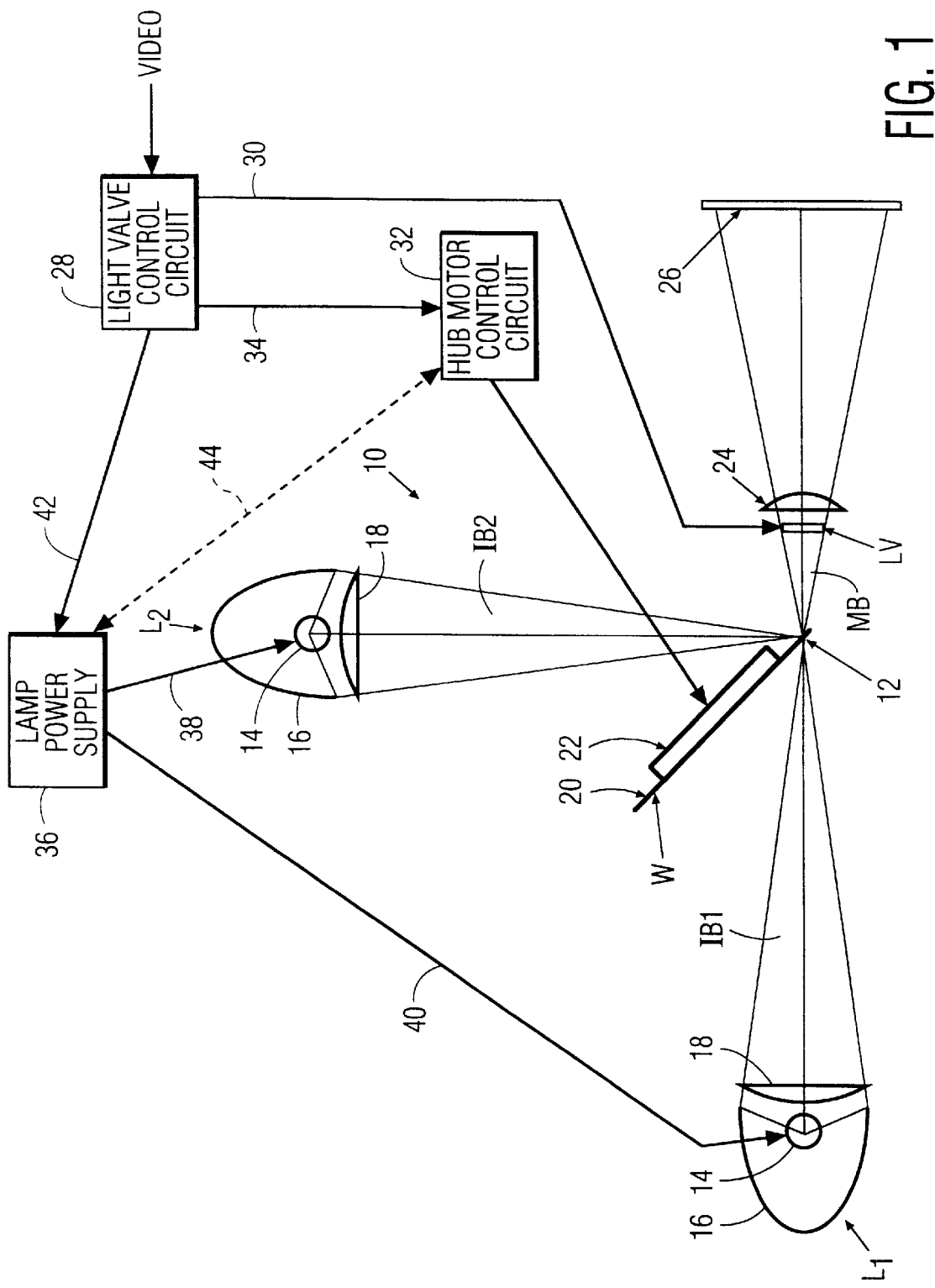
FIG. 1 shows a two lamp, single light valve system, in accordance with the invention which employs a filter wheel.

Referring first to FIG. 1 of the drawing, the system 10 of the present invention comprises two lamps L1 and L2 which are oriented at 90° to each other and direct converging input light beams, IB1 and IB2, respectively, to a focus at the same spot 12 on opposite sides of a filter wheel W oriented at 45°. Each of the lamps L1 and L2 comprise a bulb 14, reflector 16 and focusing lens 18. An annular portion 20 of filter wheel W is rotated about its axis via a hub motor 22. The beam annular portion 20 is alternately used for transmission of light from lamp L1, and reflection of input light from lamp L2, to form a multiplexed light beam MB illuminating the light valve LV. The multiplexed light beam MB exiting the wheel W may pass through an optional integrator (not shown) before reaching the light valve LV. The light valve LV modulates the multiplexed light beam MB and the image is projected by a lens 24 onto the projection screen 26. The diameter of the focussed spot is typically no smaller than one cm. and will subtend a not insignificant angular extent of the wheel, for example, about 7.5° when the radius from the center of the wheel W to the spot 12 is three inches.

Video input is received at a light valve control circuit 28 which provides a control signal via lines 30 to set the state of the pixels of the light valve LV in response to the video and thereby produces 2D modulation of the light exiting the light valve and projected onto screen 26. The hub control circuit controls the rotational speed and phase of the wheel W. It may include a suitable angular position sensor (not shown) incorporated in a phase-locked loop. Lamps L1 and L2 are alternately energized from a power supply 36, via lines 38 and 40, respectively, in accordance with an illumination cycle, which typically is synchronized with the video field rate in response to a signal provided from light valve control circuit 28 on line 42.

The lamps L1 and L2 may be at angles other than 90° to each other. The requirement is that the filter wheel be oriented such that the reflected beam and transmitted beam after the wheel be coincident with each other so as to form the multiplexed beam MB. Further, while only a single light valve LV is shown, it should be understood that the two lamp and filter wheel arrangement may be used to illuminate any type of light valve projector that would normally be illuminated with a single lamp, including two and three light valve systems and reflection type light valves.

Figure 2A:
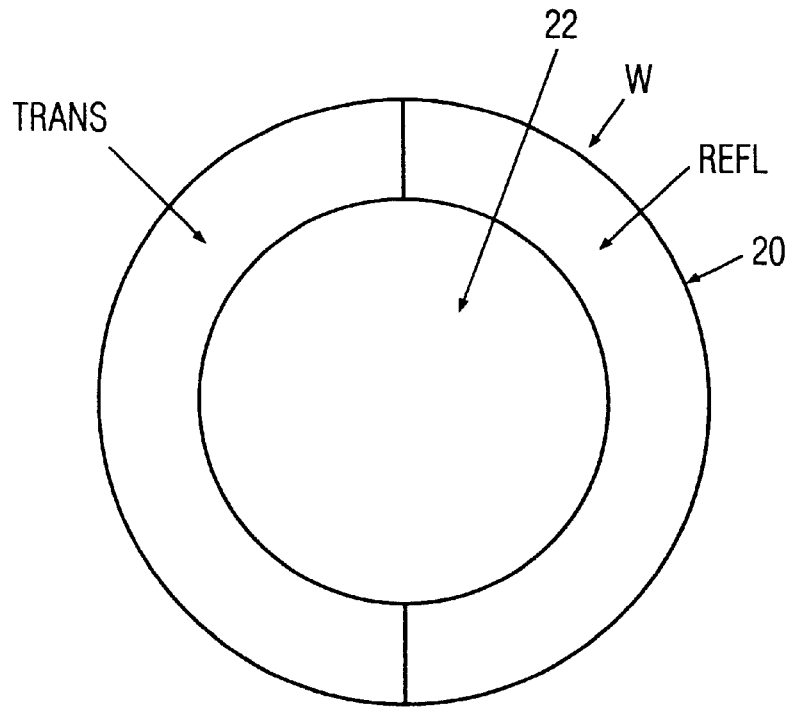
FIG. 2A shows a front view of the two segment filter wheel for use in the system of FIG. 1, the front being the side facing lamp L1.
Figure 3A:
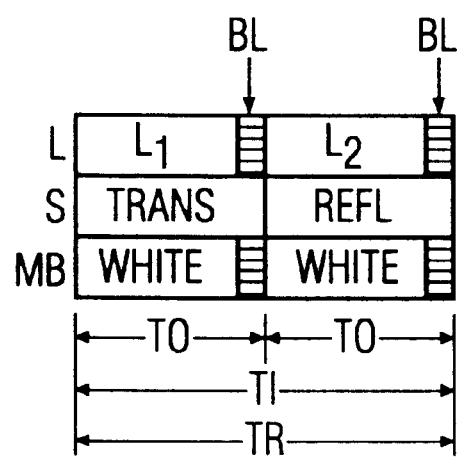
FIGS. 3A through 3E are timing diagrams of lamp activation, operative filter wheel segment, and multiplexed beam produced when using the filter wheels of FIGS. 2A through 2E, respectively.

Referring to the filter wheel W as illustrated in FIG. 2A and also to the corresponding timing diagram in FIG. 3A, it is seen that the annular portion 20 of wheel W is composed of two segments of 180° angular extent, one segment TRANS being clear so as to transmit the illumination from lamp L1 and the other segment REFL being silvered or mirrored so as to reflect the illumination from lamp L2. There results an illumination cycle having the period $T_i$ corresponding to one rotation of wheel W during a rotation period $T_r$, in which lamps L1 and L2 are alternately energized. When lamp L1 is on, the wheel in FIG. 2A is synchronized such that the clear segment TRANS is in the illumination path. The light from lamp L1 passes through the wheel and illuminates the light valve LV. When the wheel rotates to the point where the mirrored segment REFL enters the optical path, lamp L1 is switched off and lamp L2 is switched on. The light from lamp L2 now illuminates the light valve LV in the same manner as lamp L1 did earlier. To improve output light efficiency, there are preferably blanking intervals BL between alternate activations of lamps L1 and L2, which correspond to the time when the angular extent of spot 12 traverses the boundaries between the clear and mirrored segments of wheel W. Assuming each blanking interval BL corresponds to a 9° angular extent of wheel W, each of lamps L1 and L2 is run at full average power, but at approximately a 47.5% duty cycle, which is synchronized to the rotation of the filter wheel W. As appears from FIG. 3A, in each illumination cycle of lamps L1 and L2 spanning the illumination period $T_i$, the light valve LV sees an output light O from the wheel W which goes through two cycles of illumination, each having the period $T_o$. Period $T_O$ may conveniently be set equal to the field period $T_f$ of the input video, so that the wheel W need only rotate at, and the illumination cycle of lamps L1, L2 need only repeat at, one half the field rate.

In a system using a wheel W as illustrated in FIG. 2A where the wheel W does not produce a multiplexed beam MB which is color sequential, the synchronization signals from the light valve control circuit 28 on lines 34 and 42 may be eliminated if desired and instead a synchronization signal can be supplied from one of the hub motor control circuit 32 lamp power supply 36 to the other on lines 44. In such case, the illumination cycle of lamps L1, L2, and the corresponding rotation rate of wheel W, may be chosen independently of the field rate. In this mode of operation, the blanking intervals BL at the segment transitions are not utilized and the multiplexed light beam produces essentially steady illumination of the light valve LV.

Figure 2B:
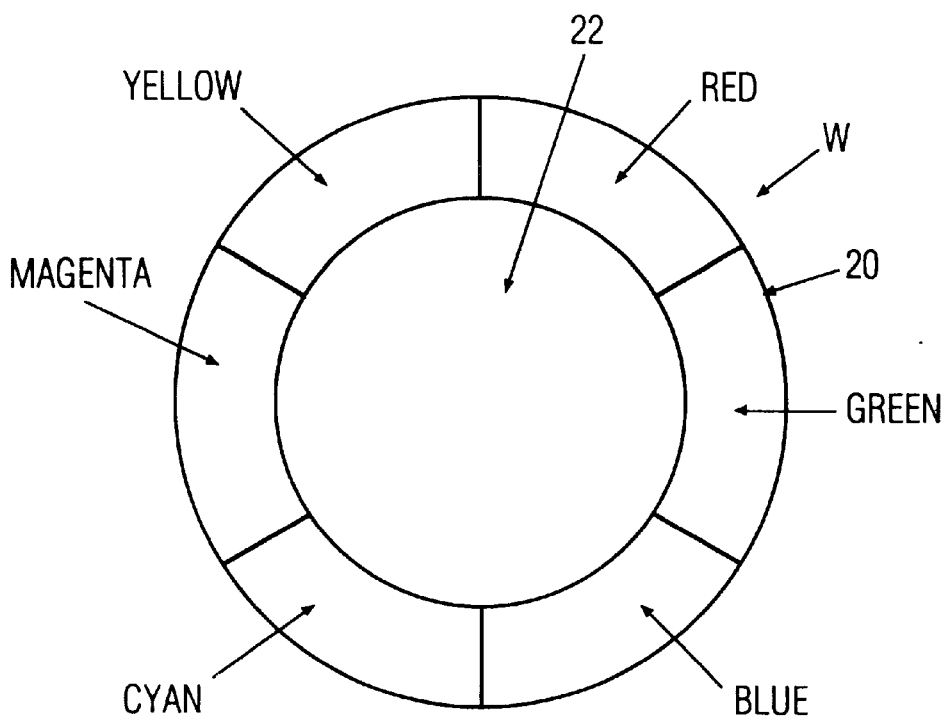
FIG. 2B shows a front view of a six segment color filter wheel for use in the system of FIG. 1.

If the projection system is a color sequential system, the rotating annular portion 20 of wheel W which is alternately used in transmission and in reflection can be a color filter wheel as shown in FIG. 2B. When seen in transmission, the filters are, for example, in the order: red, green, blue, cyan, magenta and yellow.

Figure 3B:
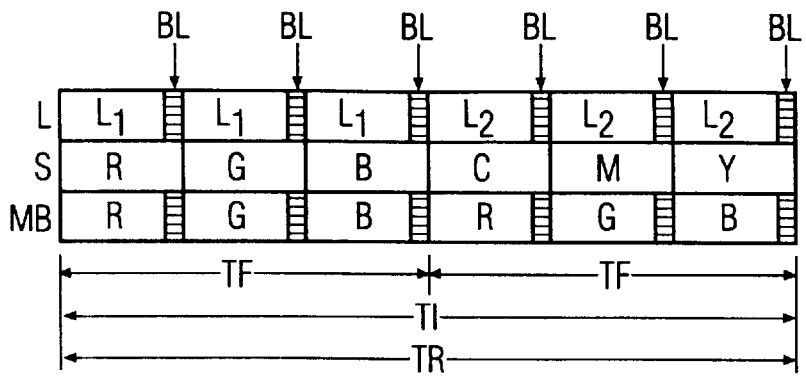

As is evident from FIG. 3B, during the red/green/blue half of the wheel, lamp L1 is turned on during each segment, with the blanking intervals BL located such that when the boundaries between segments pass through the optical path, during which lamp L1 is off. The wheel W transmits red, green and blue light in succession with the blanking intervals BL between each color, illuminating the color sequential light valve LV with multiplexed beam MB exiting wheel W. Of course, in this system the wheel and lamps must be synchronized with the video signal so that half of the illumination cycle $T_i$ equals the video field period $T_f$. Consequently, the duration of each red, green or blue segment is ⅓ the video field period $T_f$. The segment duration is 5.6 mS for a 60 Hz NTSC system, and 6.7 mS for a 50 Hz field rate system.

As the wheel continues to rotate, and the half of the wheel with the cyan, magenta and yellow segments comes into the optical path, lamp L1 is turned off and lamp L2 is turned on during each segment, again with the blanking intervals BL in between segments. The cyan segment reflects red light to illuminate the light valve LV. The magenta segment reflects green light and the yellow segment reflects blue light onto the light valve LV.

For one rotation of the wheel during a rotation period $T_r$ equal to the illumination cycle $T_i$, the light valve LV sees two sequences of red, green, and blue illumination, first by transmission of light from lamp L1, second by reflection of light from lamp L2. Therefore, for a 60 Hz video field rate, the wheel only needs to rotate at 30 revolutions per second (RPS), with the illumination cycle of lamps L1, L2 being 30 Hz. With activation of each of lamps L1 and L2 being interrupted by three blanking intervals corresponding to the time necessary for wheel W to rotate through about 9°, each lamp is operated at full average power but at about a 42.5% duty cycle.

The six segments shown in FIG. 2B are of equal width. The widths may be made unequal for color correction purposes.

FIG. 2B shows a six segment wheel, with each segment 60° in angular extent. One or more of the segments may be split, in order to reduce the color sequential artifacts. For example, green may be split on a wheel with the following segment size and order: red-60°, green-30°, blue-60°, green-30°, cyan-60°, magenta-30°, yellow-60° and magenta-30°, producing an eight segment wheel.

Figure 2C:
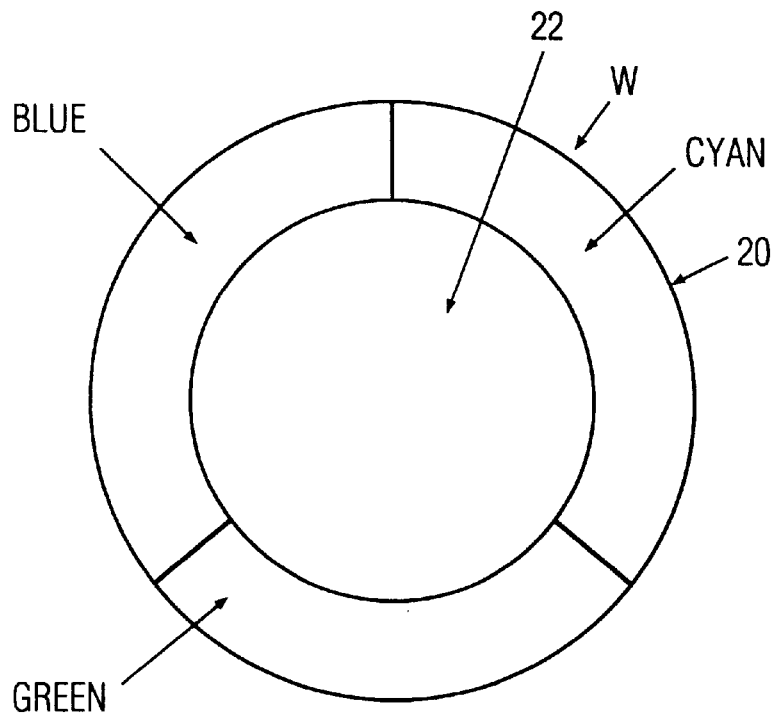
FIG. 2C shows a front view of a three segment color filter wheel for use in the system of FIG. 1.
Figure 3C:
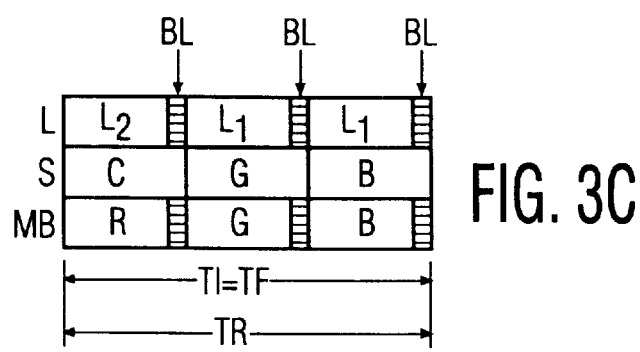

By implication, the lamps in FIG. 1 are identical. However, they may be different and tailored to different colors. For example, if lamp L1 is a Philips UHP lamp (rich in blue and green) and lamp L2 is a metal halide lamp (rich in red), the wheel in FIG. 2C could be used. In this example, as illustrated in FIG. 3C, lamp L1 has about a 61.7% duty cycle and is on while the green and blue segments are in the optical path, and lamp L2 has about a 30.8% duty cycle and is on while the cyan segment is in the optical path. Both lamps are off during the blanking intervals BL of about 9° each when the segment boundaries pass through the optical path. This wheel must rotate at 60 RPS since there is only one sequence of colors around the wheel.

Figure 2D:
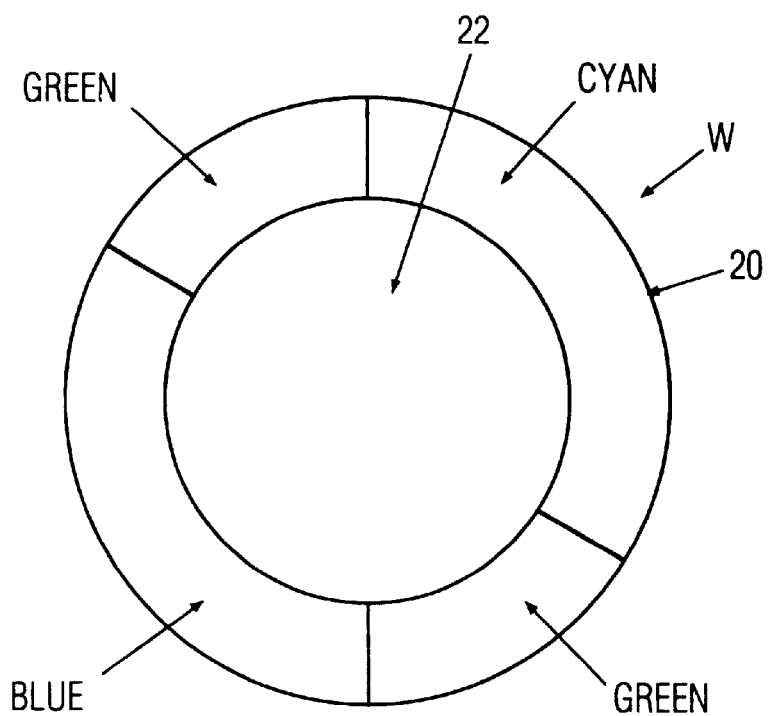
FIG. 2D shows a front view of a four segment color filter wheel for use in the system of FIG. 1.
Figure 3D:
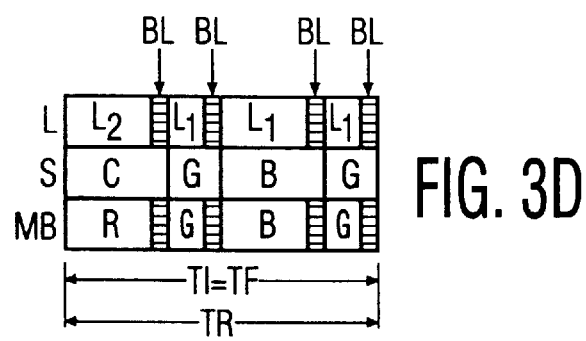

FIG. 2D shows a split green wheel for use with two different lamps. Operation is similar to that with the wheel of FIG. 2C except that the lamp power supply 36 produces an additional blanking interval BL in which lamp L1 is turned off, reducing the duty cycle of lamp L1 to about 59.2%, and the color sequential control signals produced by light valve control circuit 28 must accommodate the resultant split green phases in the color sequential illumination O exiting the wheel video as shown in FIG. 3D. The advantage of this embodiment is the reduction of color artifacts.

Other arrangements of filters may be used on the color wheel. For example, the segments to produce a single color may be collected together in the order red (L1), cyan (L2 red), green (L1), magenta (L2 green), blue (L1), yellow (L2 blue). This requires switching each lamp on and off at 3 times the video field rate. This higher frequency may in fact be the preferred mode of operation for some lamps.

Another arrangement is to do the green or other color field splitting with the green/magenta segments. This would lead to a filter order of red, cyan, green, yellow, blue, magenta. The apparent reversal of yellow and blue is to keep the pulse width on both lamps equal for all colors.

Other segment orders will readily occur to one skilled in the art.

Figure 2E:
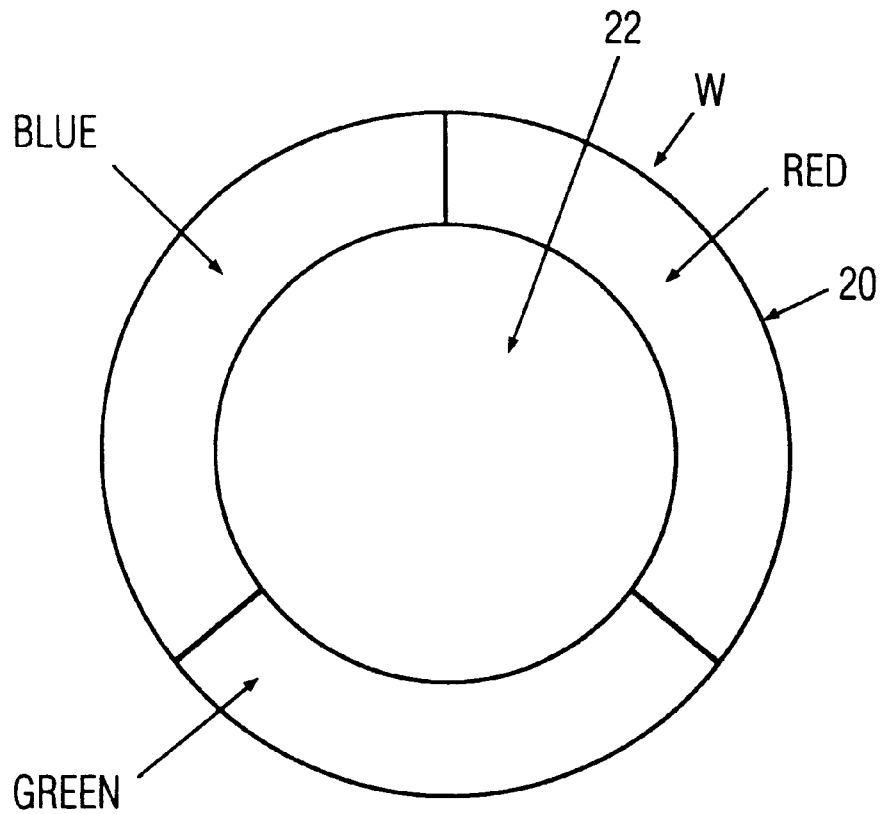
FIG. 2E shows a front view of an alternate three segment color filter wheel for use in the system of FIG. 1.
Figure 3E:
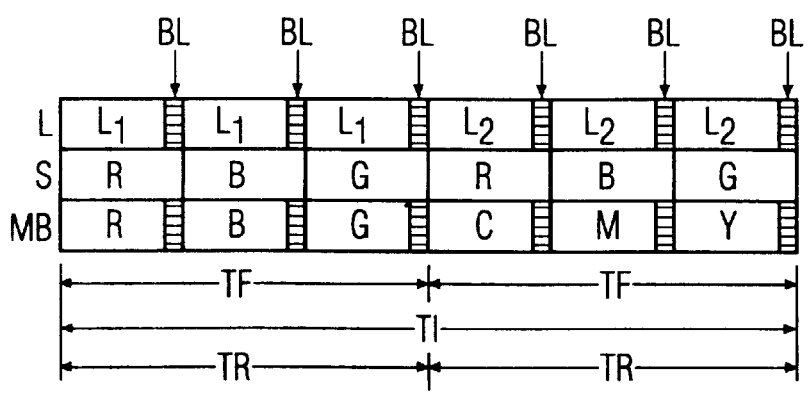
Figure 4:
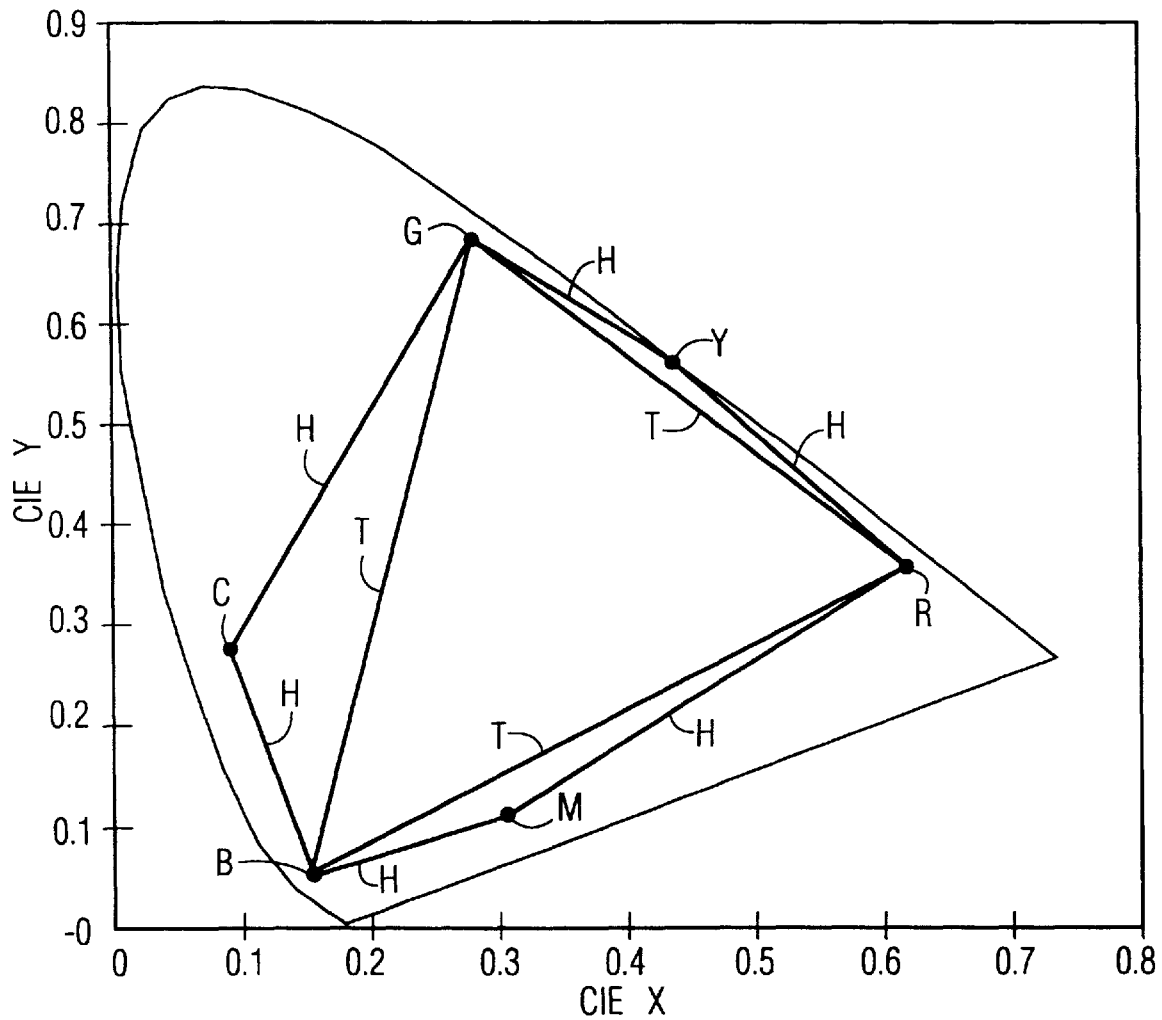
FIG. 4 is a graph showing a color gamut produced when using the color filter wheel of FIG. 2E in accordance with the timing diagram in FIG. 3E.

The same filters (red, green and blue) can be used for both the transmissive and reflective filters, replacing the cyan, magenta and yellow filters. This can be done by either duplicate sets of filters or by rotating a wheel W with only three segments, as shown in FIG. 2E, twice as fast. As appears from FIG. 3E, lamp L1 is the source of a sequence of red, green and blue colors during one revolution of wheel W and lamp L2 is the source of a sequence of their complimentary colors, cyan, magenta and yellow during the next revolution of wheel W. As before, the blanking intervals BL appear both in the illumination by lamps L1, L2 and between the successive colors of light exiting wheel W. Since the actuation of each of lamps L1 and L2 is interrupted by three blanking intervals BL and an illumination cycle of lamps L1, L2 spans 720° rotation of the wheel, each lamp is operated at full average power but at a duty cycle of about 46.25%. FIG. 4 illustrates that the color gamut of the display is expanded from a triangle having the sides T into a hexagon having the sides H.

When using the filter wheel of FIG. 2E, light valve control circuit 28 is configured to a standard RGB video signal into a non-standard RGB-CMY video signal. By assigning decoding angles to cyan, magenta and yellow, the RGB-CMY is easily derived directly from NTSC composite video. This system might have particular utility when used as a display for printing systems, because printer inks are normally cyan, magenta and yellow, rather than red, green and blue. An additional advantage of this system is that the white brightness would be 50% higher than the standard two lamp RGB system.

The rotating wheel system with good coatings on the wheel should be approximately 98% as efficient as a single lamp system. Therefore, the total light from a two lamp system would be 2×0.98=1.96 times, or nearly double, the light from a single lamp system.

While the present invention has been described in particular detail, it should also be appreciated that numerous modifications are possible within the intended spirit and scope of the invention.

What is claimed is:

1. A projection system comprising:
    a segmented rotatable wheel having at least a first light transmissive segment and a second light reflective segment;
    first and second light sources disposed at an angle with respect to each other and with respect to said wheel such that each light source illuminates a focused spot on a different side of the wheel at the same location;
    power supply means for alternately energizing said first and second light sources during respective different phases of a light source illumination cycle; and
    a light valve positioned to receive light from the spot illuminated by the first light source after transmission through the first segment of the wheel and from the spot illuminated by the second light source after reflection from the second segment of the wheel, for modulating the received light in response to a signal representing an image to form an image carrying output light beam.

2. The system as claimed in claim 1, wherein said wheel has an even number of segments, one half the number of segments being used in transmission alternating with the other half of the segments being used in reflection.

3. A projection system comprising:
    a segmented rotatable wheel;
    first and second light sources disposed at an angle with respect to each other and with respect to said wheel such that each light source illuminates a focused spot on a different side of the wheel at the same location;
    power supply means for alternately energizing said first and second light sources during respective different phases of a light source illumination cycle; and
    a light valve positioned to receive light from the spot illuminated by the first light source after transmission through the wheel and from the spot illuminated by the second light source after reflection from the wheel, for modulating the received light in response to a signal representing an image to form an image carrying output light beam,
    wherein said wheel has six color filtering segments, three segments which are used in transmission for transmitting different ones of a set of three colors from said first light source toward said light valve and three segments which are used in reflection for reflecting different ones of said three colors from said second light source toward said light valve, said segments being arranged and said wheel being synchronized in rotation with the activation of the first and second light sources such that the path portion from the first light source to said one side of the wheel and the path portion from said other side of the wheel to the light value are coupled by a segment used in transmission when the first light source is energized and said path portion from the second light source to said other side of the wheel and said path portion from said other side of the wheel to the light valve are coupled by a segment used in reflection when the second light source is energized.

4. a projection system comprising:

a segmented rotatable wheel;

first and second light sources disposed at an angle with respect to each other and with respect to said wheel such that each light source illuminates a focused spot on a different side of the wheel at the same location;

power supply means for alternately energizing said first and second light sources during respective different phases of a light source illumination cycle; and a light valve positioned to receive light from the spot illuminated by the first light source after transmission through the wheel and from the spot illuminated by the second light source after reflection from the wheel, for modulating the received light in response to a signal representing an image to form an image carrying output light beam, wherein said wheel has at least three light filtering segments for producing a set of first, second and third colors, including a first segment for transmitting the first color of said set from said first light source toward said light valve, a second segment for transmitting a second color of said set from said first light source toward said light valve and a third segment for reflecting the third color of said set from said second light source to said light valve.

5. The system of claim 4, wherein said wheel has fourth segment, which is not angularly adjacent to said second segment, for transmitting said second color from said first light source toward said light valve.

6. The system of claim 4, wherein the first light source is relatively richer in the first and second colors and the second light source is relatively richer in said third color.

7. A projection system comprising:

a segmented rotatable wheel;

first and second light sources disposed at an angle with respect to each other and with respect to said wheel such that each light source illuminates a focused spot on a different side of the wheel at the same location;

power supply means for alternately energizing said first and second light sources during respective different phases of a light source illumination cycle; and a light valve positioned to receive light from the spot illuminated by the first light source after transmission through the wheel and from the spot illuminated by the second light source after reflection from the wheel, for modulating the received light in response to a signal representing an image to form an image carrying output light beam, wherein said wheel has at least three light filtering segments for producing a set of first, second and third colors, including a first segment for transmitting the first color of said set from said first light source toward said light valve, a second segment for reflecting a second color of said set from said second light source toward said light valve and a third segment for reflecting the third color of said set from said second light source to said light valve.

8. The system of claim 6, wherein said wheel has a fourth segment, which is not angularly adjacent to said second segment, for reflecting said second color from said first light source toward said light valve.

9. The system of claim 6, wherein the first light source is relatively richer in the first color and the second light source is relatively richer in said second and third colors.

10. The system as claimed in claim 1, wherein said first and second light sources are energized during alternate revolutions of said wheel such that said illumination cycle comprises two revolutions of said wheel and said wheel has at least three light filtering segments for producing a set of six colors, each segment being used in reflection and in transmission in alternate revolutions of said wheel.

11. The system as claimed in claim 1, wherein neither of the first or second light sources is energized during intervals during which boundaries between segments of the wheel pass through the area that would be illuminated by said light sources, if energized.

12. The system as claimed in claim 2, wherein neither of the first or second light sources is energized during intervals during which boundaries between segments of the wheel pass through the area that would be illuminated by said light sources, if energized.

13. The system as claimed in claim 3, wherein neither of the first or second light sources is energized during intervals during which boundaries between segments of the wheel pass through the area that would be illuminated by said light sources, if energized.

14. The system as claimed in claim 4, wherein neither of the first or second light sources is energized during intervals during which boundaries between segments of the wheel pass through the area that would be illuminated by said light sources, if energized.

15. The system as claimed in claim 5, wherein neither of the first or second light sources is energized during intervals during which boundaries between segments of the wheel pass through the area that would be illuminated by said light sources, if energized.

16. The system as claimed in claim 6, wherein neither of the first or second light sources is energized during intervals during which boundaries between segments of the wheel pass through the area that would be illuminated by said light sources, if energized.

17. The system as claimed in claim 7, wherein neither of the first or second light sources is energized during intervals during which boundaries between segments of the wheel pass through the area that would be illuminated by said light sources, if energized.

18. The system as claimed in claim 8, wherein neither of the first or second light sources is energized during intervals during which boundaries between segments of the wheel pass through the area that would be illuminated by said light sources, if energized.

19. The system as claimed in claim 9, wherein neither of the first or second light sources is energized during intervals during which boundaries between segments of the wheel pass through the area that would be illuminated by said light sources, if energized.

20. The system as claimed in claim 10, wherein neither of the first or second light sources is energized during intervals during which boundaries between segments of the wheel pass through the area that would be illuminated by said light sources, if energized.

* * * * *